United States Patent
Hirota et al.

(10) Patent No.: US 10,497,111 B2
(45) Date of Patent: Dec. 3, 2019

(54) INFORMATION PROCESSING APPARATUS AND METHOD OF SELECTING VIEWPOINT FOR MEASURING OBJECT, AND MEASURING SYSTEM

(71) Applicant: CANON KABUSHIKI KAISHA, Tokyo (JP)

(72) Inventors: Yuichiro Hirota, Tokyo (JP); Masakazu Fujiki, Kawasaki (JP); Kazuhiko Kobayashi, Yokohama (JP); Masahiro Suzuki, Kawasaki (JP); Keisuke Tateno, Munich (DE)

(73) Assignee: CANON KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 15/634,301

(22) Filed: Jun. 27, 2017

(65) Prior Publication Data

US 2017/0372466 A1 Dec. 28, 2017

(30) Foreign Application Priority Data

Jun. 28, 2016 (JP) ................................ 2016-127780

(51) Int. Cl.
*G06K 9/00* (2006.01)
*G06T 7/00* (2017.01)
(Continued)

(52) U.S. Cl.
CPC ............ *G06T 7/001* (2013.01); *G06T 7/0002* (2013.01); *G06T 7/73* (2017.01); *G06T 7/75* (2017.01);
(Continued)

(58) Field of Classification Search
CPC ...... A63F 13/327; A63F 13/213; A63F 13/25; A63F 13/32; A63F 13/332; A63F 13/335; A63F 13/655; A63F 13/00; G06T 7/55; G06T 3/0068; G06T 15/04; G06K 9/00228
See application file for complete search history.

(56) References Cited

U.S. PATENT DOCUMENTS 9,621,793 B2   4/2017   Furihata et al.
9,630,322 B2   4/2017   Tateno
(Continued)

OTHER PUBLICATIONS

Miura et al., "Task-Oriented Generation of Visual Sensing Strategies," Journal of the Robotics Society of Japan, May 1996, pp. 574-585, vol. 14, No. 4.
(Continued)

*Primary Examiner* — Duy M Dang
(74) *Attorney, Agent, or Firm* — Carter, DeLuca & Farrell LLP

(57) ABSTRACT

An information processing apparatus comprises: a generating unit which generates, based on model information including a feature of an object, a model feature indicating the feature of the object to be acquired by observing the object respectively from a plurality of candidate viewpoints; an acquiring unit which acquires an image feature indicating features of images acquired by photographing the object respectively from the plurality of candidate viewpoints; an evaluating unit which evaluates each of the plurality of candidate viewpoints, based on a correspondence relation between the model feature and the image feature; and a selecting unit which selects, from the plurality of candidate viewpoints, one or more measurement viewpoints from which the object should be measured, on the basis of evaluation by the evaluating unit for each of the plurality of candidate viewpoints.

19 Claims, 8 Drawing Sheets

(51) Int. Cl.
*G06T 7/73* (2017.01)
*H04W 84/02* (2009.01)
*H04W 84/06* (2009.01)

(52) U.S. Cl.
CPC ........... *H04W 84/02* (2013.01); *H04W 84/06* (2013.01); *G06T 2207/10004* (2013.01); *G06T 2207/30168* (2013.01); *G06T 2207/30244* (2013.01)

(56) References Cited

U.S. PATENT DOCUMENTS

| | | |
|---|---|---|
| 9,877,012 B2 * | 1/2018 | Uchiyama .............. G06T 7/593 |
| 2015/0352719 A1 | 12/2015 | Nakazato et al. |
| 2016/0104314 A1 | 4/2016 | Nakazato et al. |
| 2016/0155235 A1 | 6/2016 | Miyatani et al. |
| 2016/0260027 A1 | 9/2016 | Kuwabara et al. |
| 2017/0236301 A1 | 8/2017 | Kobayashi et al. |

OTHER PUBLICATIONS

Tateno et al, "A Model Fitting Method Using Intensity and Range Images for Bin-Picking Applications," The IEICE (Institute of Electronics, Information and Communication Engineers) Transactions D, 2010, pp. 1-14, J94-D(8).

Hoff et al, "Analysis of Head Pose Accuracy in Augmented Reality," IEEE Trans. Visualization and Computer Graphics, Oct.-Dec. 2000, pp. 319-334, vol. 6, No. 4.

* cited by examiner

FIG. 3A    FIG. 3B    FIG. 3C
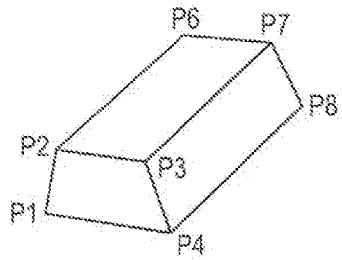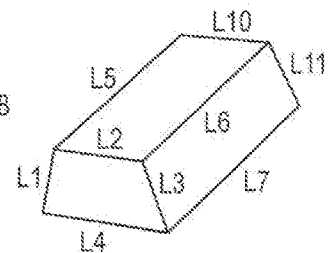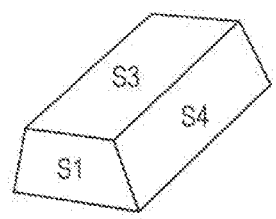
FIG. 3D
| POINT | x | y | z |
|---|---|---|---|
| P1 | 0 | 0 | 0 |
| P2 | 20 | 140 | 0 |
| P3 | 80 | 140 | 0 |
| P4 | 100 | 0 | 0 |
| P5 | 0 | 0 | 600 |
| P6 | 20 | 140 | 600 |
| P7 | 80 | 140 | 600 |
| P8 | 100 | 0 | 600 |
FIG. 3E
| LINE | TWO POINTS OF BOTH ENDS |
|---|---|
| L1 | P1, P2 |
| L2 | P2, P3 |
| L3 | P3, P4 |
| L4 | P1, P4 |
| L5 | P2, P6 |
| L6 | P3, P7 |
| L7 | P4, P8 |
| L8 | P1, P5 |
| L9 | P5, P6 |
| L10 | P6, P7 |
| L11 | P7, P8 |
| L12 | P5, P8 |
FIG. 3F
| SURFACE | SURROUNDING LINES | NORMAL LINE (x, y, z) |
|---|---|---|
| S1 | L1, L2, L3, L4 | (0, 0, -1) |
| S2 | L1, L5, L8, L9 | (-0.88, 0.12, 0) |
| S3 | L2, L5, L6, L10 | (0, 1, 0) |
| S4 | L3, L6, L7, L11 | (0.88, 0.12, 0) |
| S5 | L4, L7, L8, L12 | (0, -1, 0) |
| S6 | L9, L10, L11, L12 | (0, 0, 1) |

INFORMATION PROCESSING APPARATUS AND METHOD OF SELECTING VIEWPOINT FOR MEASURING OBJECT, AND MEASURING SYSTEM

BACKGROUND OF THE INVENTION

Field of the Invention

The present invention relates to information processing apparatus and method which select a viewpoint for measuring an object, and a measuring system which is related thereto.

Description of the Related Art

Along with the development of computer vision in recent years, a technique of measuring the position and orientation of an object in real space by photographing (or capturing) a two-dimensional image or a range image of the object and performing model fitting on the acquired image has been put to practical use. The model fitting is a method of acquiring the position, the orientation and the like of a measurement target object by matching or fitting the feature portion of the measurement target object acquired from a photographed image and the feature portion of a model imitating the measurement target object. The measurement accuracy of such a measuring method largely depends on a viewpoint from which the image of an object is photographed. For this reason, a technique of acquiring the viewpoint from which high-accuracy measurement can be performed has been studied and researched.

In case of measuring the shape of an object by a laser range sensor, there is a method of calculating an influence of sensor measurement point dispersion on the measurement result of the position and orientation of the object, and thus acquiring a viewpoint from which the measurement can most accurately be performed (for example, Jun Miura, Katsushi Ikeuchi, "Task-Oriented Generation of Visual Sensing Strategies", Journal of the Robotics Society of Japan, Vol. 14, No. 4, pp. 574-585, 1996).

However, in the above-described method, there is a factor other than the sensor measurement point dispersion as an error factor of the object position and orientation measurement. Therefore, due to the factor like this, there is a problem that the viewpoint from which highly accurate measurement can be performed cannot necessarily be acquired accurately.

SUMMARY OF THE INVENTION

According to one aspect of the present invention, in an information processing apparatus, there are provided: a generating unit configured to generate, based on model information including a feature of an object, a model feature indicating the feature of the object to be acquired by observing the object respectively from a plurality of candidate viewpoints; an acquiring unit configured to acquire an image feature indicating features of images acquired by photographing the object respectively from the plurality of candidate viewpoints; an evaluating unit configured to evaluate each of the plurality of candidate viewpoints, based on a correspondence relation between the model feature and the image feature; and a selecting unit configured to select, from the plurality of candidate viewpoints, one or more measurement viewpoints from which the object should be measured, on the basis of evaluation by the evaluating unit for each of the plurality of candidate viewpoints.

Further features of the present invention will become apparent from the following description of exemplary embodiments with reference to the attached drawings.

BRIEF DESCRIPTION OF THE DRAWINGS

FIGS. 3A, 3B, 3C, 3D, 3E and 3F are diagrams for describing an example of model information.

FIG. 9 is a diagram for describing an example of the functional constitution of the information processing apparatus and the like.

FIG. 10 is a diagram for describing an example of the functional constitution of the information processing apparatus and the like.

DESCRIPTION OF THE EMBODIMENTS

Preferred embodiments of the present invention will now be described in detail in accordance with the accompanying drawings.

Embodiment 1

Figure 1:
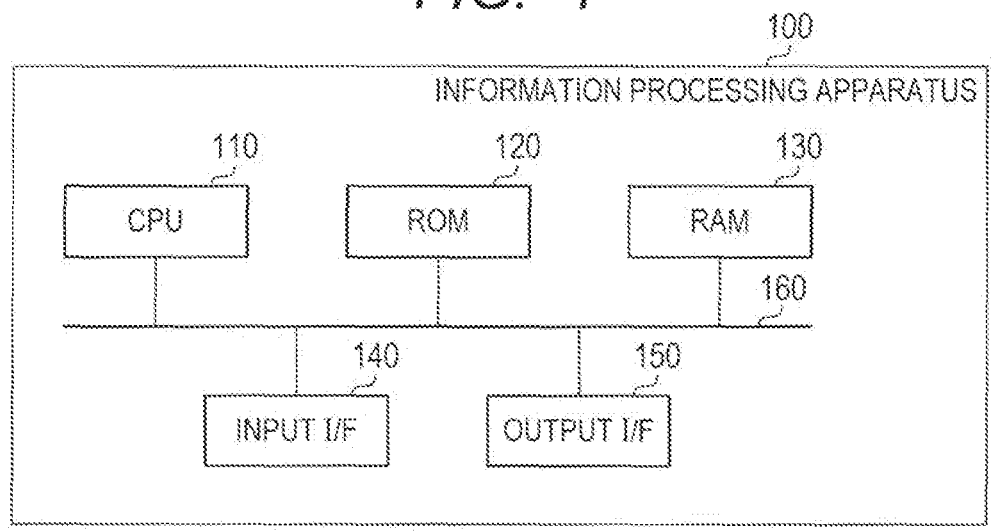
FIG. 1 is a block diagram for describing an example of the hardware constitution of an information processing apparatus.

FIG. 1 is a block diagram for describing an example of the hardware constitution of an information processing apparatus 100 according to the embodiment 1. The information processing apparatus 100 comprises a CPU (central processing unit) 110, an ROM (read only memory) 120, an RAM (random access memory) 130, an input I/F (interface) 140 and an output I/F 150. The CPU 110, the ROM 120, the RAM 130, the input I/F 140 and the output I/F 150 are mutually connected via a system bus 160.

The CPU 110 is a processor which comprehensively controls each device connected via the system bus 160. The CPU 110 reads out and executes various programs stored in the ROM 120. The ROM 120 is a storage device which stores therein a program of an OS (operating system), a program of each process according to the present embodiment, a program of a device driver, various kinds of setting information, information of various threshold values, model information of a target object, and the like. Here, the target object is an object which is to be measured. Further, the RAM 130 is a storage device which is used as a working area of the CPU 110 and a temporary storage area of various data. The CPU 110 temporarily stores the various programs acquired from the ROM 120 in the RAM 130, and then executes the stored programs as appropriate.

Besides, the input I/F 140 is an interface which is used for inputting an input signal from an external device (a displaying device, an operating device, a measuring device, a robot, or the like). Further, the output I/F 150 is an interface which is used for outputting an output signal to the external device (the displaying device, the measuring device, the robot, or the like).

Figure 4:
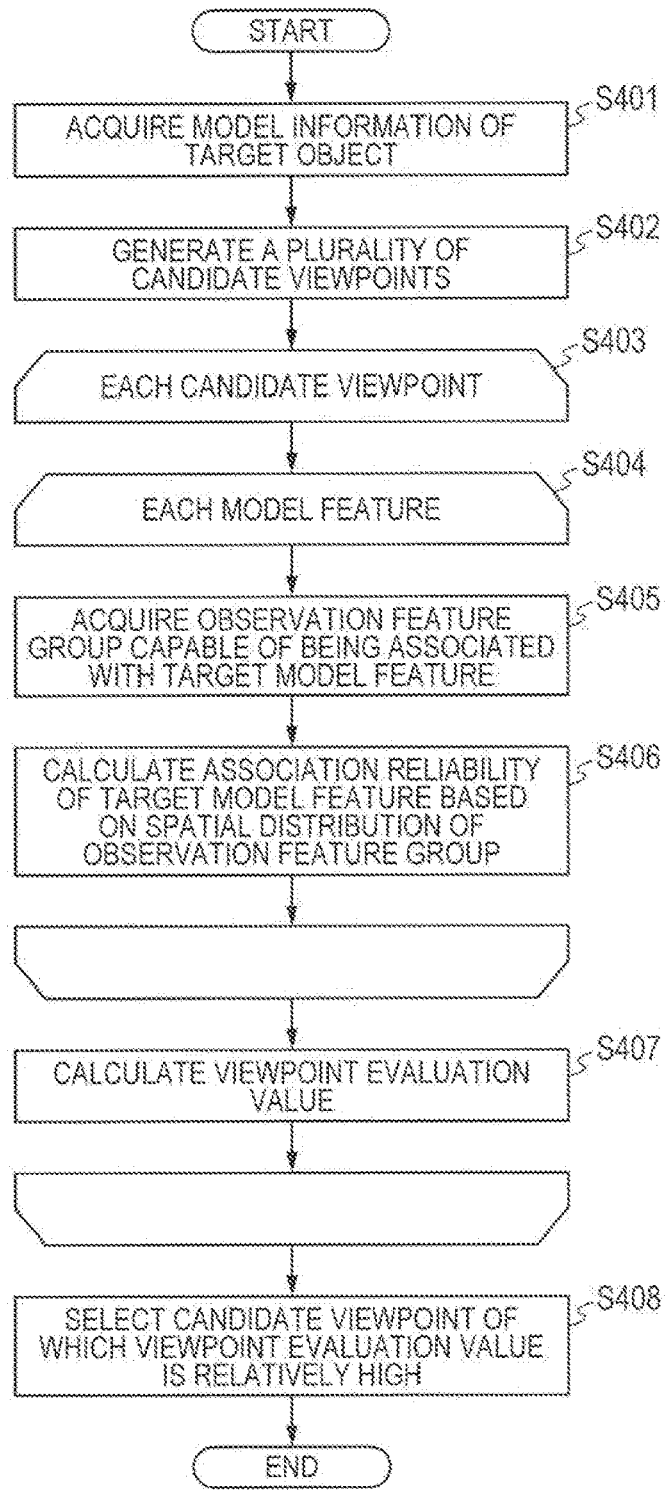
FIG. 4 is a flow chart for describing an example of a viewpoint selecting process.

In the present embodiment, the CPU 110 performs processes based on the programs stored in the ROM 120 or the like, so that the functions of the information processing apparatus 100 described later with reference to FIG. 2 and the process of a flow chart described later with reference to FIG. 4 are realized. Besides, for example, the information processing apparatus 100 may have hardware as an alternative to the program process to be executed by the CPU 110. In such a case, the information processing apparatus 100 may comprise an operation unit and a circuit corresponding to the program process to be executed by the CPU 110.

In the present embodiment, the information processing apparatus 100 is an information processing device such as a PC (personal computer), a tablet device or the like which provides information of a viewpoint suitable for observing a target object, to a measuring system which actually measures the target object. The information processing apparatus 100 acquires an observation viewpoint, and provides the information of the acquired observation viewpoint to the measuring system. Here, the measuring system is a system which includes an imaging device, a position and orientation controlling apparatus for controlling the position and the orientation of the imaging device, a position and orientation controlling apparatus for controlling the position and the orientation of the target object, and the like. The measuring system adjusts the positions and the orientations of the imaging device and the target object so as to correspond to the information of the observation viewpoint provided from the information processing apparatus 100, and then measures the target object.

In the present embodiment, there will be described a process in which the information processing apparatus 100 selects a suitable measurement viewpoint capable of measuring an object to be measured with high measurement accuracy, by using both a range image (or a distance image) and a grayscale image. In the present embodiment, the information processing apparatus 100 first acquires the range image and the grayscale image of the target object. In the present embodiment, with respect to the point sampled on a model edge, the information processing apparatus 100 associates a model feature projected on a two-dimensional image with a feature on the grayscale image. Moreover, the information processing apparatus 100 associates the model feature sampled on the surface of the model of the target object with a feature on the range image. The information processing apparatus 100 performs optimization calculation for acquiring the position and orientation of the model of the target object, based on a distribution of the features associated with the model features. The detail of a method of performing model fitting using both the range image and the grayscale image is disclosed in, for example, Keisuke Tateno, Daisuke Kotake, Shinji Uchiyama, "A Model Fitting Method Using Intensity and Range Images for Bin-Picking Applications", The IEICE (Institute of Electronics, Information and Communication Engineers) Transactions D, J94-D(8), pp. 1410-1422.

In the following, the feature which is set on the model of the target object is called the model feature. Besides, in the following, a feature which is acquired by projecting the model feature on the two-dimensional image is called a two-dimensional model feature, and a feature which is acquire by projecting the model feature on a three-dimensional image is called a three-dimensional model feature. Besides, in the following, an image feature of the target object which is extracted from an image acquired by photographing the target object is called an observation feature. Besides, a feature of the target object which is extracted from a two-dimensional image acquiring by photographing the target object is called a two-dimensional observation feature. Besides, a feature of the target object which is extracted from a three-dimensional image acquired by photographing the target object is called a three-dimensional observation feature. Besides, a viewpoint at the time when the measuring system observes the target object is called the observation viewpoint or the measurement viewpoint, and a viewpoint which is a candidate for the observation viewpoint or the measurement viewpoint is called a candidate viewpoint.

The information processing apparatus 100 calculates reliability which indicates how the association between the model feature and the observation feature is reliable at each candidate viewpoint. Here, the reliability is calculated based on a spatial distribution of an observation feature candidate group which includes candidates capable of being associated with the model feature. In the observation feature candidate group, the observation feature candidate is, among observation features, a feature which is the candidate capable of being associated with the model feature. In the present embodiment, it is assumed that, as a property of a spatial distribution of the observation feature group, the reliability of the association between the model feature and the observation feature becomes high as a density of the observation feature group becomes small. This is because the fact that the density is small means that the number of the observation features which can be incorrectly associated with the model feature is small, and thus a possibility that the observation features are incorrectly associated with the model feature is resultingly low.

Further, the information processing apparatus 100 calculates a viewpoint evaluation value which indicate superiority or inferiority of the candidate viewpoint, on the basis of a statistic of the association reliability of each model feature at each candidate viewpoint. In the present embodiment, the information processing apparatus 100 uses an average value as the statistic of the reliabilities. When the average value of the association reliabilities of the plurality of model features at a certain candidate viewpoint is high, it is generally possible to correctly associate the model feature with the observation feature at the relevant candidate viewpoint, so that accuracy of the measurement to be performed at that viewpoint is relatively high. In this manner, the information processing apparatus 100 can select the observation viewpoint at which the measurement accuracy is suitable.

Figure 2:
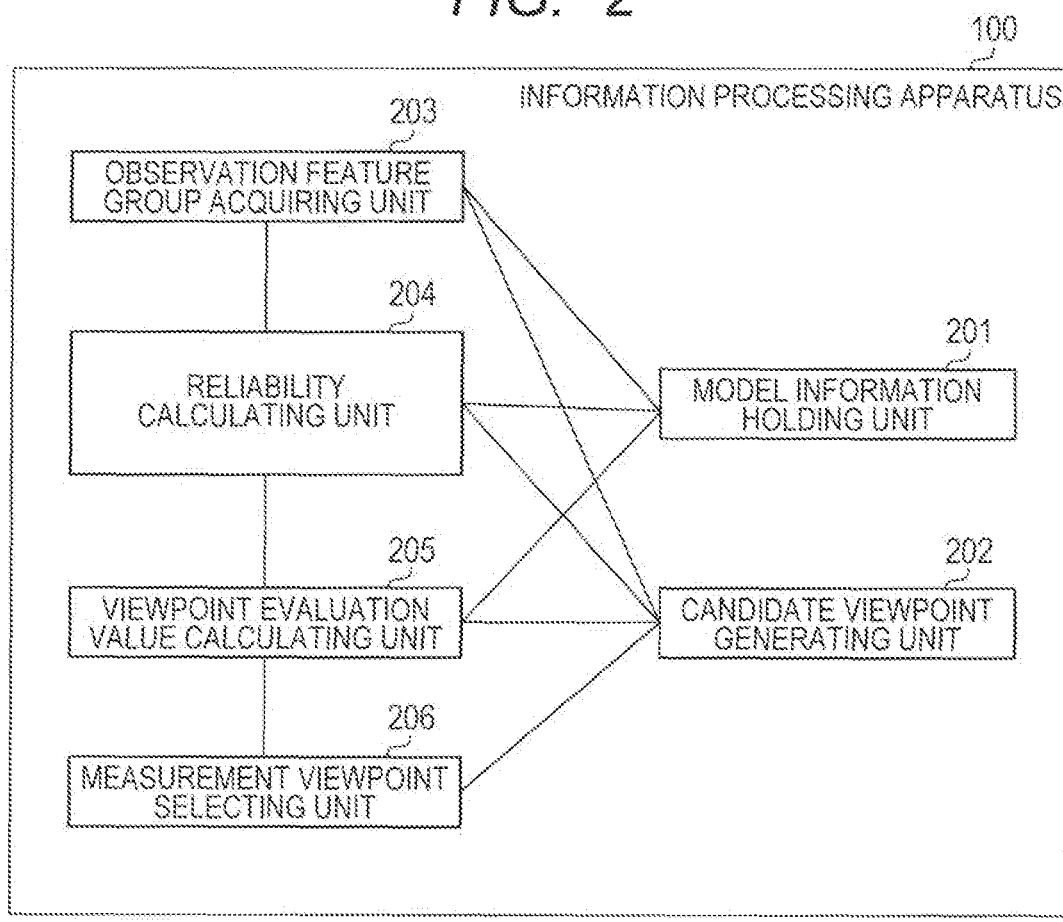
FIG. 2 is a diagram for describing an example of the functional constitution of the information processing apparatus.

FIG. 2 is a diagram for describing an example of the functional constitution of the information processing apparatus 100. The information processing apparatus 100 comprises a model information holding unit 201, a candidate viewpoint generating unit 202, an observation feature group acquiring unit 203, a reliability calculating unit 204, a viewpoint evaluation value calculating unit 205, and a measurement viewpoint selecting unit 206.

The model information holding unit 201 manages model information of a target object stored in the ROM 120 or the like. The model information is information concerning the shape of the target object. In the present embodiment, the model information includes information for identifying the shape of the target object, and information of the model feature set for the target object.

The candidate viewpoint generating unit 202 generates a plurality of candidate viewpoints. The candidate viewpoint generated by the candidate viewpoint generating unit 202 is an object for which the viewpoint evaluation value indicating the superiority or inferiority of the viewpoint is calculated by the viewpoint evaluation value calculating unit 205.

The observation feature group acquiring unit 203 acquires, among the observation features acquired from the images acquired when photographing the object at the set viewpoint, the observation feature group capable of being associated with an arbitrary model feature.

The reliability calculating unit 204 calculates the reliability of the association between the model feature and the observation feature group. In the present embodiment, the reliability calculating unit 204 calculates the reliability of the association between each model feature included in the model information and the observation feature acquired by the observation feature group acquiring unit 203. The higher the reliability of the association (association reliability), the higher a possibility that the observation feature to be associated with the model feature is correct. On the other hand, the lower the reliability of the association, the higher a probability that the observation feature to be associated with the model feature is erroneous.

On the basis of the association reliability acquired when associating each model feature with the observation feature at a certain viewpoint, the viewpoint evaluation value calculating unit 205 calculates the viewpoint evaluation value which indicates quality (good or bad) of the measurement accuracy at the time of actually measuring the target object from the relevant viewpoint.

The measurement viewpoint selecting unit 206 selects one or more measurement viewpoints from the candidate viewpoints, based on the viewpoint evaluation value calculated by the viewpoint evaluation value calculating unit 205.

An example of the model information of a target object stored in advance in the ROM 120 or the like will be described with reference to FIGS. 3A to 3F. More specifically, FIGS. 3A to 3C are the diagrams for describing the points, the lines and the surfaces of a model of the same target object, respectively. FIG. 3D is the diagram for describing each vertex information of the model corresponding to FIG. 3A. FIG. 3E is the diagram for describing line information serving as each side of the model corresponding to FIG. 3B. FIG. 3F is the diagram for describing each surface information of the model corresponding to FIG. 3C. Further, as shown in FIG. 3F, the model information includes information of the normal lines of the surfaces constituting the model.

FIG. 4 is a flow chart for describing an example of a viewpoint selecting process to be performed by the information processing apparatus 100 according to the present embodiment. More specifically, the process contents will be described along the flow chart of FIG. 4.

In S401, the model information holding unit 201 acquires the model information of the target object from the ROM 120 or the like.

Figure 5:
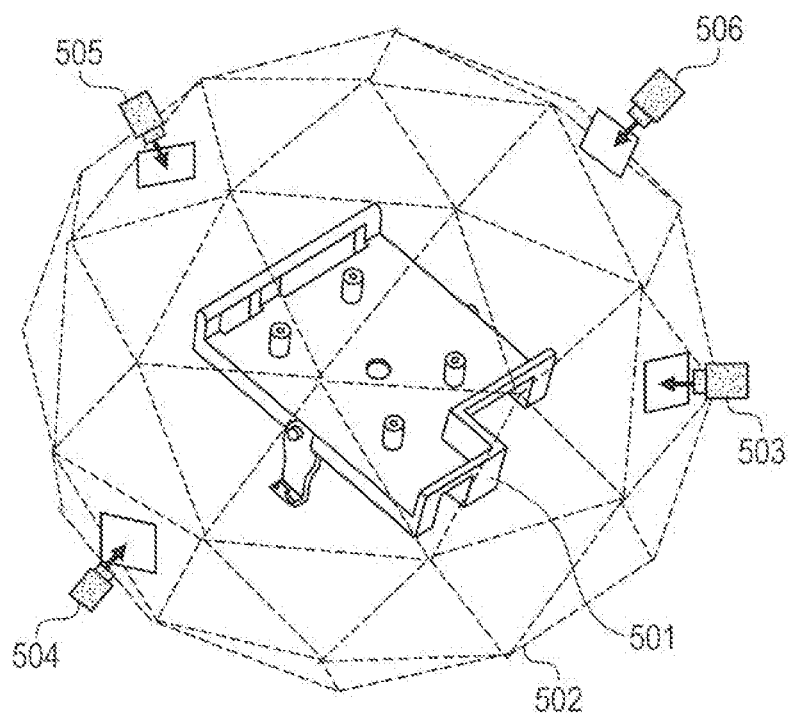
FIG. 5 is a view for describing an example of a measurement candidate viewpoint generating method.

In S402, the candidate viewpoint generating unit 202 generates a plurality of candidate viewpoints for measuring the target object. In the present embodiment, as illustrated in FIG. 5, the candidate viewpoint generating unit 202 generates a geodesic dome 502 which is acquired by approximating a spherical surface of an appropriate radius (for example, the distance from the imaging device of the measuring system to a target object 501 when the actual measurement is performed), with a triangular polyhedron. Then, the candidate viewpoint generating unit 202 defines a viewpoint based on the position and the direction of each of the triangular surfaces. The candidate viewpoint generating unit 202 generates a viewpoint to be the candidate viewpoint from the defined viewpoint. For example, the candidate viewpoint generating unit 202 may generate all the defined viewpoints as the candidate viewpoints, or may select the viewpoints of which the number is randomly set from the defined viewpoint and generate the selected viewpoints as the candidate viewpoints. Here, viewpoints 503 to 506 indicate a part of the viewpoints which are generated by the candidate viewpoint generating unit 202.

In S403, the viewpoint evaluation value calculating unit 205 controls to perform processes in S404 to S407 for each of the candidate viewpoints generated in S402. In the following, it is assumed that the candidate viewpoint to be processed in the processes (S404 to S407) in the loop is called a target candidate viewpoint.

In S404, the reliability calculating unit 204 acquires the model features from the model information of the target object acquired in S401, and controls to perform the processes in S405 to S406 for each of the acquired model features. In a case where the measuring system for measuring the actual target object by using the measurement viewpoint selected by the information processing apparatus 100 adopts the model fitting of a range image/grayscale image combined method, the measuring system performs the following process. That is, the measuring system acquires a model feature to be subject to the model fitting to the grayscale image and a model feature to be subject to the model fitting to the range image.

The model feature to be subject to the model fitting to the grayscale image is, among the plurality of sample points equally set at the interval set on the line segments indicated in FIG. 3E, the sample point which can be observed in the image acquired by observing the model from the viewpoint. The model feature to be subject to the model fitting to the range image is, among the plurality of sample points equally set at the interval set on the surfaces indicated in FIG. 3F, the sample point which can be observed in the image acquired by observing the model from the viewpoint. For this reason, in the present embodiment, with respect to the model feature which can be used for the model fitting by the measuring system, the information processing apparatus 100 calculates the reliability of the association with the observation feature group, and acquires the evaluation value of the candidate viewpoint based on the calculated reliability. Then, the information processing apparatus 100 selects the observation viewpoint from among the candidate viewpoints, based on the acquired evaluation value. By doing so, the information processing apparatus 100 can provide a suitable observation viewpoint to the measuring system which actually measures the target object.

In the following, it is assumed that the model feature to be processed in the processes (S405 to S406) in the loop is called a target model feature.

In S405, the observation feature group acquiring unit 203 acquires the observation feature group which can be associated with the target model feature. In the following, the process of acquiring the observation feature group will be described by dividing into a case where the target model feature is a model feature used for the model fitting to the grayscale image and a case where the target model feature is a model feature used for the model fitting to the range image.

(In Case of Associating Target Model Feature with Observation Feature Group of Grayscale Image)

In the present embodiment, the observation feature group acquiring unit 203 acquires the grayscale image acquired by photographing the target object from the target candidate viewpoint, by the following process instead of the actual photographing. That is, the observation feature group acquiring unit 203 acquires the grayscale image by a simulation process in which a model of the target object placed in a virtual space is photographed by a camera installed at the target candidate viewpoint in the virtual space. The observation feature group acquiring unit 203 determines the camera parameter of the camera installed in the virtual space, in accordance with the parameter of the camera that the preset measuring system actually uses in the measurement. It is assumed that the camera parameter of the camera that the measuring system uses is acquired in advance by a calibration process by the measuring system.

Next, the observation feature group acquiring unit 203 calculates the observation feature group which can be associated with the target model feature from the generated grayscale image. In the present embodiment, at the time of the measurement, the measuring system associates the target model feature with the edge (an extreme value of the brightness of a pixel) of the grayscale image acquired by photographing the target object. Therefore, in the present embodiment, the observation feature group acquiring unit 203 acquires the edge of the grayscale image as the observation feature.

For example, the observation feature group acquiring unit 203 first projects the target model feature onto the grayscale image acquired by the simulation process. Next, the observation feature group acquiring unit 203 searches a range (the set number of pixels) set in the direction orthogonal to the direction of the edge to which the target model feature belongs, and the edge (the extreme value of the brightness of the pixel) of the grayscale image, thereby extracting all the pixels (edges) indicating extreme values with brightness larger than a set threshold value. Here, the extracted edge is an example of the point in the two-dimensional coordinates formed by the axis of the edge direction to which to which the target model feature belongs and the axis set in the direction orthogonal to the axis of the edge direction. The observation feature group acquiring unit 203 sets the coordinate information of the extracted pixel on the two-dimensional coordinate as the observation feature. The observation feature group acquiring unit 203 sets all the extracted pixels as the observation image feature group which can be associated with the target model feature. The range which is set as the range for searching the edge is, for example, a range which is acquired by converting a range in which the target object may be shifted in a real environment that the measuring system measures the target object, into an area on the image. That is, the range which is set as the range for searching the edge is the area which is centered on the target model feature and corresponds to the range in which the target object may be shifted in the real environment. This area is an example of a peripheral area which is set around the target model feature.

(In Case of Associating Target Model Feature with Observation Feature Group of Range Image)

In the present embodiment, the observation feature group acquiring unit 203 acquires the range image acquired by photographing the target object from the target candidate viewpoint, by the following process instead of the actual photographing. That is, the observation feature group acquiring unit 203 acquires the range image by a simulation process in which the model of the target object placed in the virtual space is photographed by the camera installed at the target candidate viewpoint. The observation feature group acquiring unit 203 determines the camera parameter of the camera installed in the virtual space, in accordance with the parameter of the camera that the preset measuring system actually uses in the measurement. It is assumed that the camera parameter of the camera that the measuring system uses is acquired in advance by the calibration process by the measuring system.

Next, the observation feature group acquiring unit 203 calculates the observation feature group which can be associated with the target model feature being a three-dimensional model feature from the acquired range image. In the present embodiment, at the time of measurement, the measuring system associates the target model feature with the point on the three-dimensional coordinates indicated by the pixel of the range image acquired by photographing the target object. Therefore, in the present embodiment, the observation feature group acquiring unit 203 acquires the point on the three-dimensional coordinates as the observation feature. Hereinafter, the point on the three-dimensional coordinates is called a three-dimensional point.

For example, the observation feature group acquiring unit 203 projects the target model feature onto the range image acquired by the simulation process, and acquires the three-dimensional point group indicated by the range image pixels included in the rectangular area set around the projected target model feature. The rectangular area which is set around the relevant target model feature is an example of a peripheral area. Next, the observation feature group acquiring unit 203 sets a plurality of bins by partition at a distance interval set in the normal direction of the surface to which the target model feature belongs. Then, the observation feature group acquiring unit 203 distributes the three-dimensional point group acquired based on the rectangular area in the vicinity of the target model feature, to the bins based on the normal direction distance from the surface. The observation feature group acquiring unit 203 acquires, for all the bins including one or more elements, sets the three-dimensional point acquired by averaging the coordinates of the three-dimensional point of the included element as the observation feature group which can be associated with the target model feature. The range of the rectangle which is used when acquiring the three-dimensional point group is, for example, a range which is determined based on the range in which the target object may be shifted when the measuring system actually measures the target object. Besides, the partition distance for the bins is, for example, a value which is equivalent to resolution of the range image.

In S406, the reliability calculating unit 204 calculates the reliability of the association between the target model feature and the observation feature group acquired in S405, based on the spatial distribution of the observation feature group.

In the present embodiment, it is assumed that as the density of the observation feature group which can be associated with the target model feature is smaller, the association between the target model feature and the observation feature group has higher reliability. Moreover, it is assumed that as the density of observation feature group which can be associated with the target model feature is larger, the reliability of the association between the target model feature and the observation feature group becomes lower. This is because, since the decrease in the relevant density means the decrease in the observation feature which may be erroneously associated, the decrease in the relevant density lowers a possibility of the erroneous association. In the present embodiment, for example, the reliability calculating unit 204 calculates the reliability of the association as a reciprocal of the density, by using the number of the elements of the observation feature group acquired in S405 as the density.

In S407, the viewpoint evaluation value calculating unit 205 acquires the viewpoint evaluation value which indicates how suitable the target candidate viewpoint is for the measurement of the actual target object, based on the statistic of the reliability of the association of each of the model features calculated in S406. Here, the statistic is a value which indicates the feature and tendency of a certain group (data) as a whole, and includes, for example, an average value, a variance value, a deviation value, a median value, a mode value, the number of values higher than a set threshold value, the number of values lower than the set threshold value, or the like. As the number of the model features with the high association reliability increases, the evaluation of the candidate viewpoint increases, thereby increasing the evaluation value. For example, the viewpoint evaluation value calculating unit 205 calculates the average value of the association reliabilities of the model features as the viewpoint evaluation value.

In S408, the measurement viewpoint selecting unit 206 identifies the highest viewpoint evaluation value from among the viewpoint evaluation values acquired in S407, and selects the candidate viewpoint corresponding to the identified viewpoint evaluation value as the observation viewpoint. Besides, the measurement viewpoint selecting unit 206 may identify the plurality of viewpoint evaluation values in descending order of the viewpoint evaluation value from among the viewpoint evaluation values acquired in S407, and select the plurality of candidate viewpoints corresponding to the identified viewpoint evaluation values as the observation viewpoints.

In the present embodiment, the model information of the target object is stored in the ROM 120. However, for example, an external server device or a storage device with which the information processing apparatus 100 can communicate via a network may store therein the model information of the target object. In such a case, the information processing apparatus 100 acquires the model information of the target object from the external device like this via the network.

In the present embodiment, the candidate viewpoint generating unit 202 generates in S402 the candidate viewpoint by using the position and the direction of each surface of the geodesic dome acquired by approximating the spherical surface centered on the target object by the triangular polyhedrons. However, the candidate viewpoint generating unit 202 may generate the candidate viewpoints randomly on the spherical surface centered on the target object. Besides, in S402, the candidate viewpoint generating unit 202 may generate the candidate viewpoint by using the position and the direction of each surface of the geodesic dome acquired by approximating the spherical surface centered on the target object by an arbitrary polygonal polyhedron. Besides, if there are a plurality of known fixed points as the viewpoints from which the actual measurement is performed by the measuring system, the candidate viewpoint generating unit 202 may generate the viewpoints corresponding to the plurality of fixed points as the candidate viewpoints.

In the present embodiment, the observation feature group acquiring unit 203 acquires the image to be used for acquiring the observation feature group which can be associated with each model feature, by the simulation process based on the model information of the target object, the model corresponding to the candidate viewpoint and the relative position and orientation of the camera. However, the observation feature group acquiring unit 203 may perform a simulation process which more faithfully reproduces the information concerning the site environment where the measuring system actually performs the measurement. For example, the observation feature group acquiring unit 203 may generate the image of the target object by performing a more faithful simulation process in which also information concerning a kind and a position of a lighting on the site where the measurement is performed is reflected. Thus, the observation feature group acquiring unit 203 can acquire an observation feature group which is closer to the actual environment.

In the present embodiment, the observation feature group acquiring unit 203 acquires the observation feature from the image of the target object acquired by the simulation process. However, there is no limitation for how to acquire the observation feature. For example, the observation feature group acquiring unit 203 may generate a partial image in which only the range in which the observation feature of the target object is intended to be searched is photographed (or captured), not the image of the entire target object, by the simulation process, and may extract the observation feature group from the generated partial image. Besides, the observation feature group acquiring unit 203 may directly calculate the observation feature without using a data structure called an image. For example, the observation feature group acquiring unit 203 may directly calculate a position which serves as an edge when the target object is observed, from a geometric shape of the model of the target object.

In the present embodiment, the reliability calculating unit 204 calculates the reliability of the association between the model feature and the observation feature group, based on the density of the observation feature group in the set area near the model feature, that is, the number of observation features in the set area. However, the method of calculating the reliability of the association between the model feature and the observation feature group to be performed by the reliability calculating unit 204 is arbitrary as long as it is a calculating method based on the spatial distribution of the observation feature group. For example, the reliability calculating unit 204 may calculate the reliability of the association by a method in which it is possible to determine whether or not an observation feature being a failure factor of the association exists in the vicinity of the model feature. Besides, for example, the reliability calculating unit 204 may calculate the reliability of the association, such that the larger the value acquired by dividing the distance between the position of the model feature and the observation feature second-closest to the position of the model feature by the distance between the position of the model feature and the observation feature closest to the position of the model feature, the higher the reliability of the association.

In the present embodiment, the measuring system performs the model fitting as the measurement of the position and orientation of the target object, by using the observation viewpoint determined by the process of the present embodiment by the information processing apparatus 100. However, the measuring system may measure the position and orientation of the target object by a method other than the model fitting, by using the observation viewpoint determined by the information processing apparatus 100. In case of performing the process of calculating the position or orientation of the target object, it is possible for the measuring system to use the observation viewpoint determined by the process of the present embodiment, by associating the model with the observation feature acquired by observing the target object from the set viewpoint.

For example, it is assumed that the measuring system associates the model feature with the observation feature group by using template matching, a SIFT (Scale-Invariant Feature Transform) feature amount, a feature amount of an entire edge line segment and the like from an image, and thus measures the position and orientation of the target object. Even in this case, it is possible for the measuring system to use the observation viewpoint selected by the process of the present embodiment, based on the distribution of the spatial positions of the observation features of the candidate to be associated with the model feature.

The model information is arbitrary as long as it can be the model feature when checking the position and orientation of the target object. In the present embodiment, the model information is the information which includes the information of the vertex, the edge and the surface. However, the ROM 120 may store therein the information of the template image acquired from the images of the target object photographed from the plurality of candidate viewpoints and the information of the SIFT feature amount, as the model information.

In the present embodiment, the viewpoint evaluation value calculating unit 205 calculates the average value of the association reliability of the model feature as the viewpoint evaluation value, as a method of acquiring the viewpoint evaluation value of the candidate viewpoint. However, the viewpoint evaluation value calculating unit 205 may use a statistic other than the average value. For example, the viewpoint evaluation value calculating unit 205 may calculate, as the viewpoint evaluation value, the total number of the model features having the association reliability equal to or higher than a set threshold, because it becomes preferable as the number of the model features of which the association reliabilities are higher than the set threshold value increases.

In the present embodiment, the information processing apparatus 100 performs the process of acquiring the suitable measurement viewpoint by using the range image and the grayscale image. However, the information processing apparatus 100 may perform the process of acquiring the suitable measurement viewpoint by using any one of the range image and the grayscale image. For example, when the measuring system performs the process of measuring the target object by using only the grayscale image, the information processing apparatus 100 may perform the process of acquiring the suitable measurement viewpoint based on the grayscale image of the target object. That is, the information processing apparatus 100 may perform the processes described in S406 to S407 (in case of associating the target model feature with the observation feature group of the grayscale images). Besides, when the measuring system performs the process of measuring the target object by using only the range image, the information processing apparatus 100 may perform the processes described in S406 to S407 (in case of associating the target model feature with the observation feature group of the range images). Besides, when the measuring system performs the process of measuring the target object by using three kinds of images, that is, e.g., an infrared image in addition to the grayscale image and the range image, the information processing apparatus 100 may perform such a process as described below. That is, in S405 and S406, the information processing apparatus 100 acquires the model feature and the observation feature in the infrared image, and calculates the association reliability of the model feature based on the spatial distribution of the observation feature groups which can be associated with each model feature. Then, the information processing apparatus 100 may perform the process of acquiring the viewpoint evaluation value based on the association reliabilities of all the model features acquired for the grayscale image, the range image and the infrared image.

As described above, according to the process of the present embodiment, the information processing apparatus 100 can select the viewpoint which is suitable for the measurement of the target object by the measuring system from among the viewpoints used when measuring the target object. That is, the information processing apparatus 100 can select the suitable measurement viewpoint from which it is possible to measure the target object with higher measurement accuracy.

(Modification 1-1)

The viewpoint evaluation value calculating unit 205 may perform, as the method of acquiring the viewpoint evaluation value of the candidate viewpoint, a method in which not only the association reliability of the model feature but also a spatial distribution of the model features is taken into consideration. For example, it is assumed that viewpoints where the model features of which the association reliabilities with the observation feature group are favorable are spatially distributed uniformly are desirable viewpoints.

The viewpoint evaluation value calculating unit 205 narrows down the model feature corresponding to the viewpoint to the model feature having the association reliability equal to or higher than a certain threshold value, and then performs main component analysis for the position of the narrowed-down model feature. Besides, based on an eigenvalue which is acquired by the main component analysis, the viewpoint evaluation value calculating unit 205 may calculate the viewpoint evaluation value, such that a satisfactory value can be acquired as the model features having the association reliabilities equal to or higher than the set threshold value are distributed uniformly in the space. For example, the viewpoint evaluation value calculating unit 205 may calculate, as the viewpoint evaluation value, a value which is acquired by dividing an eigenvalue of a second main component by the eigenvalue of the first main component, in regard to the two-dimensional model feature. As just described, by taking also the spatial distribution of the model features having the high association reliabilities into consideration, the viewpoint evaluation value calculating unit 205 can more correctly select the observation viewpoint from which the target object can be measured with a high degree of accuracy.

(Modification 1-2)

The measurement accuracy of the measuring system at the observation viewpoint is influence not only by the association reliability of the model feature but also dispersion of the measurement points which may occur when the target object is measured. With respect to the feature which is important for determining the position and orientation of the target object, as the measurement variation becomes large, also the variation in the position and orientation of the target object to be acquired becomes large. For this reason, a method of calculating the viewpoint evaluation value in which not only the association reliability between the model feature and the observation feature group but also the measurement dispersion of the observation features is taken into consideration will be described.

A covariance matrix S of the six-parameter position and orientation acquired by the fitting of minimizing the distance between the corresponding points of the model feature and the observation feature on the image is determined based on the association reliability of the model feature, the spatial distribution of the model features, and the measurement dispersion of the observation features. The viewpoint evaluation value calculating unit 205 calculates the viewpoint evaluation value of the measurement viewpoint such that, as the value of the covariance matrix S becomes smaller, the higher evaluation value is given. Incidentally, the covariance matrix S of the position and orientation can be acquired by the following expression (1).

$$S = J^+ W \begin{bmatrix} \sigma_1^2 & & & 0 \\ & \sigma_2^2 & & \\ & & \ddots & \\ 0 & & & \sigma_N^2 \end{bmatrix} W^T (J^+)^T \quad (1)$$

$$J^+ = (J^T J)^{-1} J^T \quad (2)$$

$$W = \begin{bmatrix} W_1 \\ W_2 \\ \vdots \\ W_N \end{bmatrix}$$

The symbol J in the expressions (1) and (2) is a Jacobian matrix of the model feature position, and is a coefficient matrix which is acquired by performing partial differentiation to the change amount of the position in the image space of each of the model features by the translatory movement indicating the position and orientation and the rotational six parameters. Besides, the symbol N in the expressions (1) and (3) indicates the total number of the model features. Besides, each of the symbols $\sigma_1, \sigma_2, \ldots, \sigma_N$ in the expression (1) indicates the dispersion (variance) of the position of the observation feature which is associated with each model feature, and is the dispersion of the measurement point which is determined by a noise characteristic or the like of the measuring system. Besides, each of the symbols $W_1, W_2, \ldots, W_N$ in the expression (3) is the association reliability of each of the model features calculated in S406. The detail of the expressions which indicate that the dispersion of the position of the observation feature propagates to the measurement accuracy of the model fitting is described in detail in, for example, W. Hoff and T. Vincent, "Analysis of head pose accuracy in augmented reality", IEEE Trans. Visualization and Computer Graphics, Vol. 6, No. 4, 2000.

Since the covariance matrix S of the position and orientation which is acquired by the expressions (1) to (3) includes the translatory component and the rotational component, it is difficult to directly compare the magnitude relation between the covariance matrix S and a covariance matrix acquired at another candidate viewpoint as they are. Therefore, the viewpoint evaluation value calculating unit 205 further converts the covariance matrix S of the position and orientation calculated using the expressions (1) to (3) into a covariance matrix of the three-dimensional position of the furthest point on the model (that is, among the points on the model, the point most distant from the origin in the model coordinate system). Then, the viewpoint evaluation value calculating unit 205 calculates the square root of the maximum eigenvalue of the converted covariance matrix as the viewpoint evaluation value. Thus, the information processing apparatus 100 can more correctly select the measurement viewpoint from which it is possible to measure the target object with a high degree of accuracy, by simultaneously taking into consideration not only the association reliability but also the influence of the measurement point dispersion on the measurement accuracy.

(Modification 1-3)

There is a case where a part of the target object to be measured by the measuring system is shielded at any time in the same way by another object (hereinafter, called a shielding object). For example, when the measuring system measures an assembly which is grasped in a predetermined way by a robot which grasps a target object, a part of the target object is shielded at any time by the robot in the same way. In the case like this, the information processing apparatus 100 can also take into consideration the influence of the shielding also in the measurement viewpoint selecting process, based on handling of the shielding in the measuring system.

For example, it is assumed that the measuring process is performed by masking the area which is shielded when the measuring system measures the target object partially shielded. In this case, the ROM 120 previously stores the shape information concerning the shielding object and the information concerning the relative positions and orientations of the shielding object and the target object. Then, the model information holding unit 201 manages, together with the model information of the target object, the shape information concerning the shielding object and the information concerning the relative positions and orientations of the shielding object and the target object. Then, in S405, the observation feature group acquiring unit 203 performs the following process. That is, the observation feature group acquiring unit 203 acquires the shape information concerning the shielding object and the information concerning the relative positions and orientations of the shielding object and the target object, from the model information holding unit 201. Based on the acquired information, the observation feature group acquiring unit 203 acquires the information concerning the area where the target object is shielded by the shielding object on the image of the target object which is photographed from the candidate viewpoint. When acquiring the observation feature group in the vicinity of the model feature, the observation feature group acquiring unit 203 acquires the observation feature from the remaining area by masking the area which is shielded by the shielding object.

With the above process, the information processing apparatus 100 can select the measurement viewpoint having higher measurement accuracy even in the case where the measuring system measures the target object which is partially shielded.

(Modification 1-4)

The measurement viewpoint selecting unit 206 may present the suitable measurement viewpoint of the viewpoint evaluation value selected in S408, to the user.

Figure 6A:
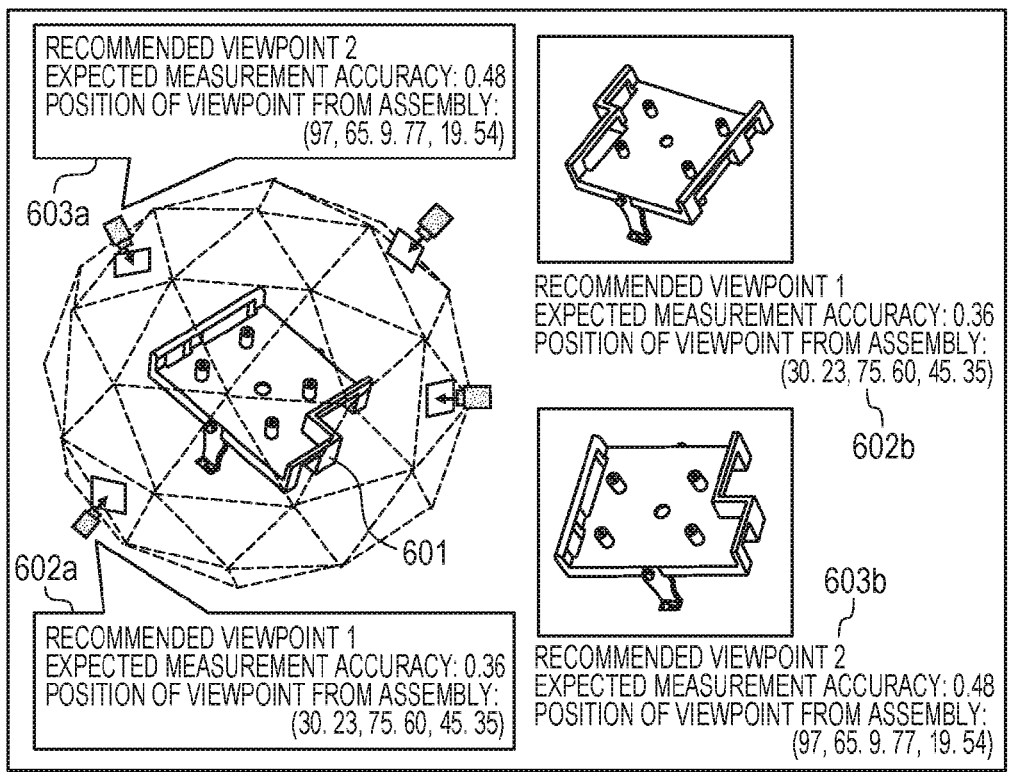
FIGS. 6A and 6B are diagrams for describing examples of the display screens of measurement viewpoints.

For example, the measurement viewpoint selecting unit 206 may arrange the positions and directions of the plurality of measurement viewpoints selected in S408 together with the target object in a virtual three-dimensional space, and display the positions and directions on the display unit or the like of the information processing apparatus 100. In addition, the measurement viewpoint selecting unit 206 may display the image of the target object which is observed from an arbitrary measurement viewpoint. FIG. 6A is a diagram for describing an example of the screen for presenting the suitable measurement viewpoint selected in S408 to the user. More specifically, a positional relation of the plurality of suitable viewpoints with respect to a target object 601 is displayed as a recommended viewpoint 1 (viewpoint 602a) and a recommended viewpoint 2 (viewpoint 603a) in descending order of the magnitude of the viewpoint evaluation values. The measurement viewpoint selecting unit 206 can rotate the target object 601 in an arbitrary direction based on a mouse drag operation or the like of the information processing apparatus 100. Then, when the target object is rotated, the measurement viewpoint selecting unit 206 subserviently rotates the recommended viewpoints. In addition, the measurement viewpoint selecting unit 206 displays, in separate sections 602b and 603b, images which show how the assembly (target object) is seen from the respective suitable viewpoints.

Figure 6B:
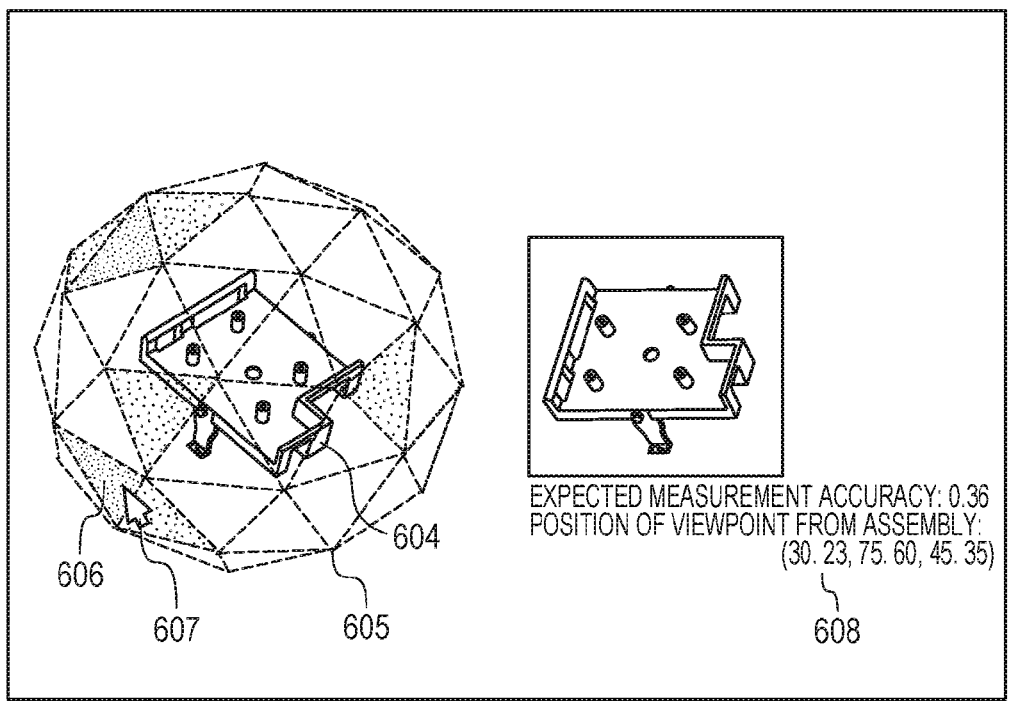

The measurement viewpoint selecting unit 206 may further display the viewpoint evaluation values of the plurality of selected measurement viewpoints together with the respective positions and directions of the viewpoints. FIG. 6B is a diagram for describing an example of the screen for presenting, to the user, the suitable measurement viewpoint selected in S408 and its viewpoint evaluation value. In the example of FIG. 6B, the measurement viewpoint selecting unit 206 performs the following process such that the magnitude relation between each candidate viewpoint and the viewpoint evaluation value can be known at a glance. That is, the measurement viewpoint selecting unit 206 displays, in gray scale, the respective viewpoint evaluation values on the surfaces of a geodetic dome 605 which indicates the measurement viewpoints of a target object 604, such that the higher the viewpoint evaluation value, the higher the surface density. The measurement viewpoint selecting unit 206 can rotate each of the target object 604 and the geodesic dome 605 in an arbitrary direction based on a mouse dragging operation or the like of the information processing apparatus 100. Thus, it is possible to rotate the target object and the geodesic dome such that they interlock. Then, when a mouse pointer 607 is hovered over an arbitrary viewpoint (for example, a surface 606 in case of the viewpoint 603a), the measurement viewpoint selecting unit 206 displays, in a separate section 608, the perspective of the corresponding viewpoint (that is, how the target object is seen from the corresponding viewpoint), the viewpoint evaluation value of the corresponding viewpoint, and the attribute information such as the viewpoint position information and the like.

It should be noted that the preferred viewpoint displaying method described as above is merely an example, and the viewpoint displaying method is not limited to the described method. For example, in addition to the method of pointing the surface of the geodesic dome, the measurement viewpoint selecting unit 206 may use, as the method of displaying the position and the direction of the viewpoint, a method of simply displaying a camera object indicating the viewpoint without using the geodesic dome. Moreover, in addition to the method of displaying the viewpoint evaluation value by means of the density on the surface of the geodesic dome, the measurement viewpoint selecting unit 206 may indicate, as the display method of the viewpoint evaluation value, the level of the viewpoint evaluation value by means of colors. Besides, the measurement viewpoint selecting unit 206 may indicate the viewpoint evaluation value by coloring the camera object or changing the size thereof, without displaying the geodesic dome.

As described above, the information processing apparatus 100 can represent, to the user, the positions and the directions of the plurality of selected suitable viewpoints, the viewpoint evaluation values of these viewpoints, and the image observed from the viewpoints, by displaying them. By viewing the displayed screen, the user can easily confirm how the target object is seen from the selected viewpoint.

Embodiment 2

In the embodiment 1, in order to acquire the suitable viewpoint, the information processing apparatus 100 calculates the viewpoint evaluation value at the candidate viewpoint on the basis of the reliability of the association between the model feature and the observation feature group at the candidate viewpoint. However, in the present embodiment, in addition to the association reliability of the observation feature at the candidate viewpoint, the information processing apparatus 100 also takes into consideration the association reliability of the model feature at a vicinity viewpoint which is set around the candidate viewpoint, and thus calculates the viewpoint evaluation value. Here, the vicinity viewpoint is a viewpoint which is included in a minute area set centering on the candidate viewpoint, and includes also the candidate viewpoint itself.

For example, when calculating the viewpoint evaluation value which indicates the superiority or inferiority of the candidate viewpoint, the information processing apparatus 100 calculates the association reliability of the model feature at the vicinity viewpoint of each of the plurality of candidate viewpoints, and calculates the viewpoint evaluation value based on the statistic of the calculated reliabilities, e.g., the minimum value of the reliability. Then, the information processing apparatus 100 selects, as the observation viewpoint, the candidate viewpoint of which the viewpoint evaluation value is relatively high. By doing so, when the measuring system measures the target object, the information processing apparatus 100 can select the viewpoint from which the measuring system can measure the target object with a high degree of accuracy, while taking into consideration that a small amount of shift occurs in the vicinity of the observation viewpoint.

The hardware constitution of the information processing apparatus 100 in the present embodiment is the same as that illustrated in FIG. 1, and the functional constitution of the information processing apparatus 100 in the present embodiment is the same as that illustrated in FIG. 2. However, in the present embodiment, the processes of the candidate viewpoint generating unit 202 and the viewpoint evaluation value calculating unit 205 are different from those described in the embodiment 1. In the present embodiment, the points which are different from the embodiment 1 will be described. In the present embodiment, the CPU 110 performs processes based on the programs stored in the ROM 120 or the like, so that the functions of the information processing apparatus 100 described with reference to FIG. 2 and the process of a flow charts described later with reference to FIG. 7 are realized.

Figure 7:
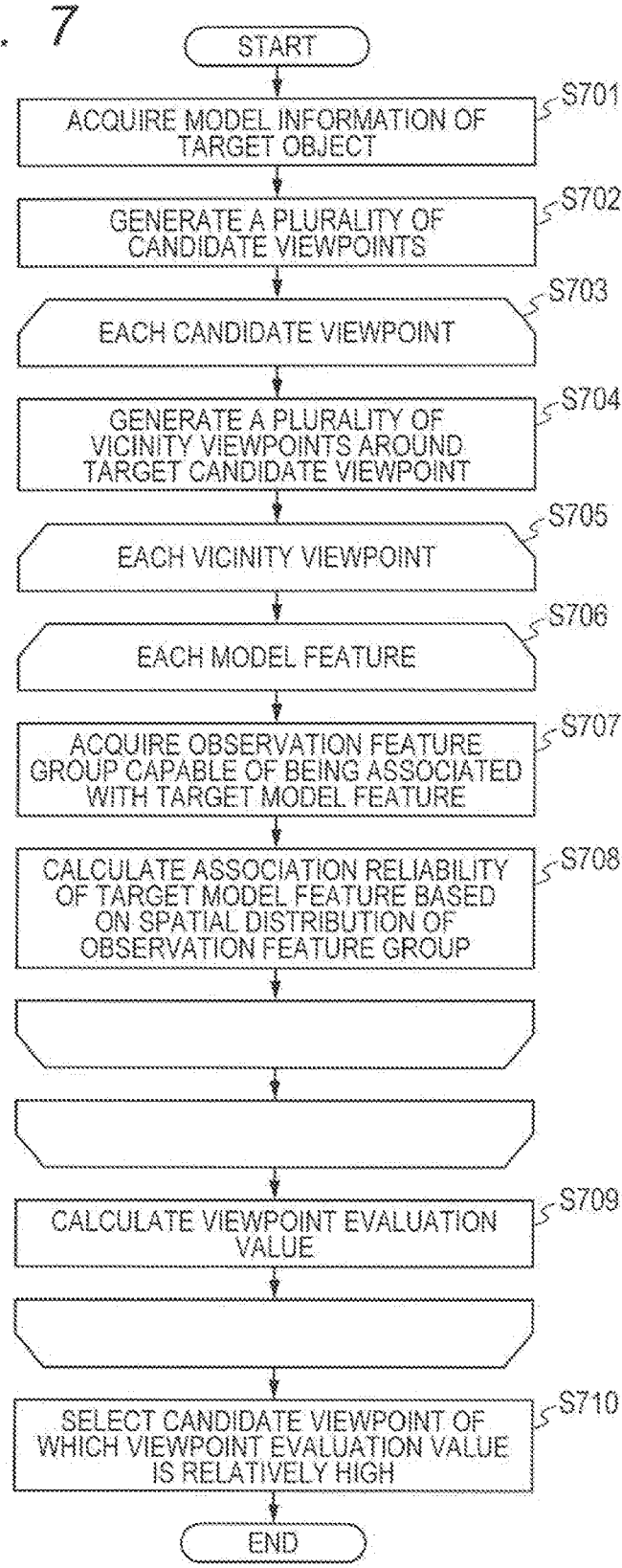
FIG. 7 is a flow chart for describing an example of the viewpoint selecting process.

FIG. 7 is the flow chart for describing an example of the viewpoint selecting process to be performed by the information processing apparatus 100. In the flow chart, the processes of S701 to S703 are the same as the processes of S401 to S403.

In S704, the candidate viewpoint generating unit 202 generates a plurality of vicinity viewpoints around the candidate viewpoint. For example, the candidate viewpoint generating unit 202 makes the division granularity of polyhedron fine only in the vicinity of the candidate viewpoint, in the geodesic dome to be used for generating each candidate viewpoint. Then, the candidate viewpoint generating unit 202 generates, as the vicinity viewpoints, the viewpoints respectively corresponding to the division surfaces of the portion which is acquired by making the division granularity fine.

In S705, the reliability calculating unit 204 controls to repeat processes of S706 to S708 for each of the vicinity viewpoints generated in S704. In the following, the vicinity viewpoint for which the processes of S706 to S708 are performed will be called a target vicinity viewpoint.

In S706, the reliability calculating unit 204 acquires the model feature from the model information of the target object acquired in S701, and controls to perform the processes of S707 to S708 for each of the acquired model features. In the following, the model feature to be processed in S707 to S708 will be called a target model feature.

As well as S405, in S707, the observation feature group acquiring unit 203 acquires the observation feature group which can be associated with the target model feature, from the image acquired based on the target vicinity viewpoint.

As well as S406, in S708, the reliability calculating unit 204 calculates the association reliability of the target model feature based on the spatial distribution of the observation feature group.

In S709, the viewpoint evaluation value calculating unit 205 calculates the viewpoint evaluation value of the target candidate viewpoint. For example, the viewpoint evaluation value calculating unit 205 calculates the viewpoint evaluation value of each vicinity viewpoint by the process same as the process of S407, in each vicinity viewpoint of the target candidate viewpoint. Furthermore, the viewpoint evaluation value calculating unit 205 sets the lowest evaluation value out of the viewpoint evaluation values acquired at each vicinity viewpoint, as the evaluation value of the target candidate viewpoint. That is, the measurement viewpoint selecting unit 206 selects the measurement viewpoint based on the evaluation value in the case where a condition is not suitable at each candidate viewpoint. Thus, the measurement viewpoint selecting unit 206 can select the measurement viewpoint in preparation for a case where the condition is most degraded.

As well as S408, in S710, the measurement viewpoint selecting unit 206 selects, from among the candidate viewpoints, the candidate viewpoint of which the viewpoint evaluation value is relatively high. For example, the measurement viewpoint selecting unit 206 selects, as the measurement viewpoint, one viewpoint which has the highest viewpoint evaluation value from among the candidate viewpoints. Besides, the measurement viewpoint selecting unit 206 may select, as the measurement viewpoints, a plurality of viewpoints such as two, three, or the like having the highest viewpoint evaluation value, from among the candidate viewpoints.

In the present embodiment, the means for generating the vicinity viewpoint around each candidate viewpoint is not limited to that described above, as long as it can generate a plurality of vicinity viewpoints within a viewpoint range which may be shifted when the target object is set such that the measuring system can measure it. The method of generating the plurality of viewpoints by making the division granularity of the polyhedron fine only in the vicinity of the candidate viewpoint in the geodesic dome used to be used for generating each candidate viewpoint described in S704 is merely an example. Besides, for example, the candidate viewpoint generating unit 202 may generate a vicinity viewpoint at random on a spherical surface which is centered on the target object. Moreover, when measuring the target object which is grasped with a robot by the measuring system, the candidate viewpoint generating unit 202 may generate a vicinity viewpoint in an area within a predetermined range in the direction along which a grasp shift may occur.

As described above, according to the process of the present embodiment, even in the case where the small amount of shift occurs in the vicinity of the viewpoint when the measuring system performs the measurement, the information processing apparatus 100 can select the measurement viewpoint from which the measuring system can perform the measurement with a higher degree of accuracy.

Embodiment 3

In the embodiment 1, the information processing apparatus 100 calculates the viewpoint evaluation value of the candidate viewpoint based on the grayscale image and the range image generated by the simulation process. However, in the present embodiment, the information processing apparatus 100 calculates the viewpoint evaluation value based on observation information which is acquired by actually observing the target object at a candidate viewpoint by the measuring system. By doing so, the information processing apparatus 100 can acquire the grayscale image and the range image of the target object while also taking into consideration factors which influence the observation information difficult to be reproduced by simulation, for example, an influence of not-modeled illumination, reflection unevenness of the surface of the target object, and the like. Thus, the information processing apparatus 100 can more accurately select a suitable measurement viewpoint.

Figure 8:
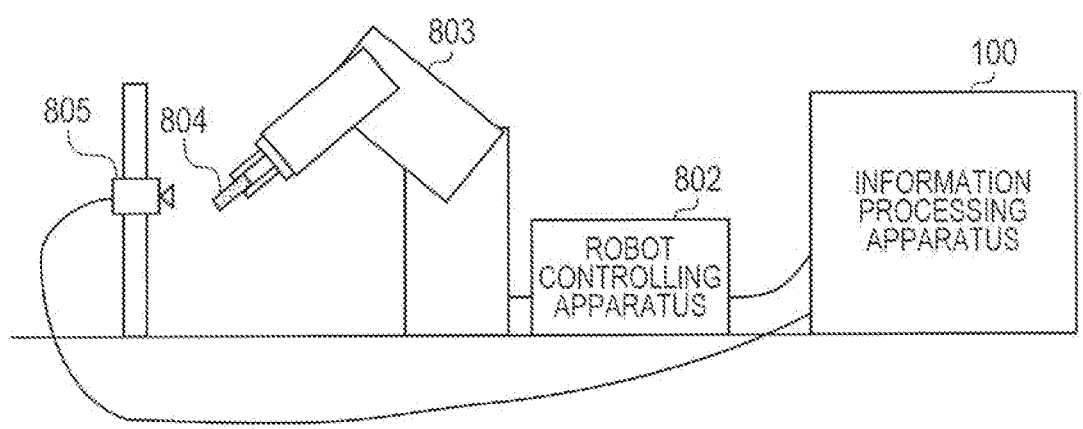
FIG. 8 is a diagram for describing an example of the system configuration of a measuring system.

FIG. 8 is a diagram for describing the appearance of the measuring system of the present embodiment. The measuring system comprises a robot controlling apparatus 802, a robot 803, a measuring device 805, and the information processing apparatus 100. More specifically, the robot controlling apparatus 802 operates the robot 803 based on a command received from the information processing apparatus 100. The robot 803 grasps a target object 804, and controls the position and orientation of the target object. The measuring device 805 is a measuring device such as a camera or the like, which measures the target object from the candidate viewpoint selected by the information processing apparatus 100. The robot 803, the measuring device 805 and the information processing apparatus are mutually connected with others via a network or the like. The hardware constitution of the information processing apparatus 100 is the same as that of the embodiment 1. In the present embodiment, the CPU 110 performs processes based on the programs stored in the ROM 120 or the like, so that the functions of the information processing apparatus 100 described later with reference to FIG. 9 and the process of the flow chart described with reference to FIG. 4 are realized.

Figure 9:
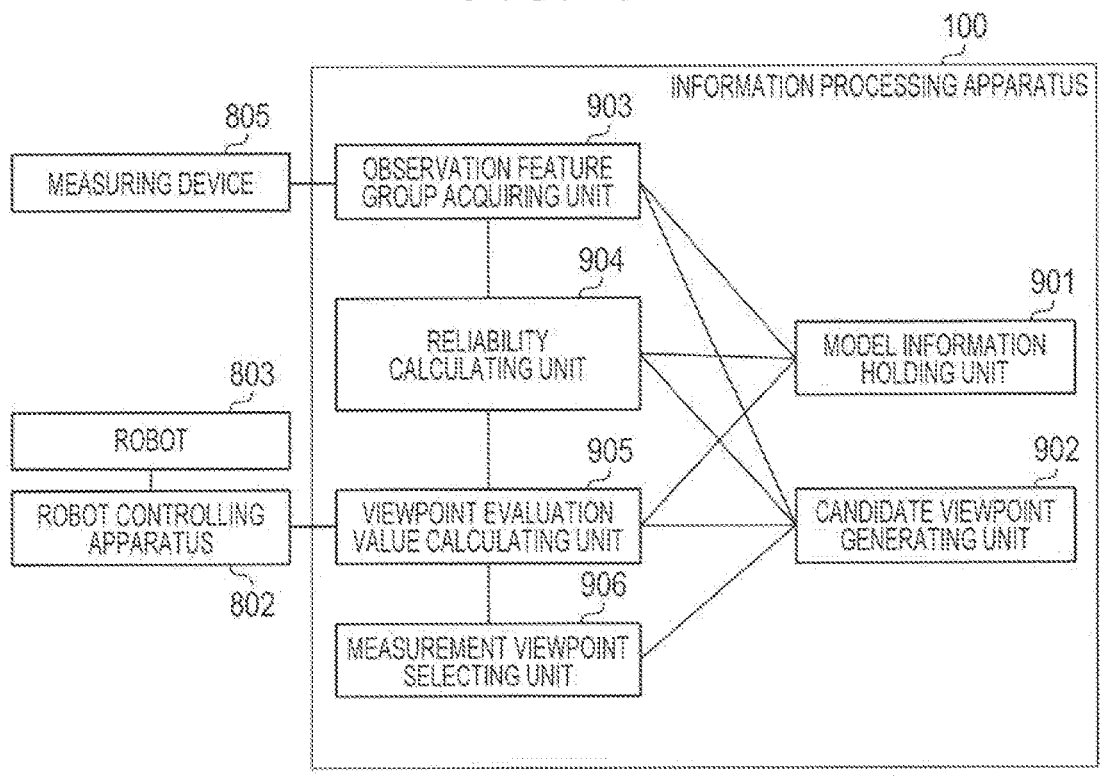

FIG. 9 is the diagram for describing an example of the functional constitution and the like of the information processing apparatus 100 according to the present embodiment. The information processing apparatus 100 comprises a model information holding unit 901, a candidate viewpoint generating unit 902, an observation feature group acquiring unit 903, a reliability calculating unit 904, and a measurement viewpoint selecting unit 906. Here, it should be noted that the model information holding unit 901, the candidate viewpoint generating unit 902, the reliability calculating unit 904 and the measurement viewpoint selecting unit 906 are substantially the same as the model information holding unit 201, the candidate viewpoint generating unit 202, the reliability calculating unit 204 and the measurement viewpoint selecting unit 206 in the embodiment 1, respectively. On the other hand, the observation feature group acquiring unit 903 is different from the observation feature group acquiring unit 203. Hereinafter, the elements which are different from those in the embodiment 1 will be described.

The observation feature group acquiring unit 903 communicates with the measuring device 805, and thus acquires the observation feature group based on the observation information such as the photographed (captured) image of the target object acquired from the measuring device 805. A viewpoint evaluation value calculating unit 905 communicates with the robot controlling apparatus 802, and issues a command to the robot 803 to control the position and orientation of the target object such that the viewpoint from which the measuring device 805 measures the target object becomes the same viewpoint as each candidate viewpoint. Then, the observation feature group acquiring unit 903 acquires the photographed image of the target object from the measuring device 805, further acquires the grayscale image and the range image from the acquired photographed image, and acquires the observation feature group at each candidate viewpoint. Moreover, when the measuring device 805 comprises a monochrome camera or the like, the observation feature group acquiring unit 903 may acquire the grayscale image photographed by the measuring device 805 from the measuring device 805. Besides, when the measuring device 805 comprises a range image camera or the like, the observation feature group acquiring unit 903 may acquire the range image directly photographed by the measuring device 805 from the measuring device 805.

Next, a process to be performed by the information processing apparatus 100 according to the present embodiment will be described. Since the basic process flow is the same as the procedure described in FIG. 4, only the difference from the embodiment 1 will be described. It is assumed that the relative position and orientation between the robot 803 and the measuring device 805 and the camera parameters of the measuring system have been calibrated in advance. Moreover, it is assumed that how to grasp the target object 804 by the robot 803 has been determined in advance, and the relative positions and orientations of the target object 804 and the robot 803 at this time are also known. Therefore, it is assumed that the relative positions and orientations of the measuring device 805 and the target object 804 at the time when the measuring system performs the measurement at an arbitrary viewpoint are also known.

In this case, when performing the loop for calculating the viewpoint evaluation value at each of the candidate viewpoints in S403, the viewpoint evaluation value calculating unit 905 causes to move, via the robot, the target object 804 so as to be the relative position and orientation to realize the target candidate viewpoint. Then, in S405, in regard to the observation information acquired at the target candidate viewpoint from the measuring device 805, the observation feature group acquiring unit 903 acquires the observation feature group. The other processes are the same as those described in the embodiment 1.

In the present embodiment, the measuring system grasps and moves the target object 804 via the robot 803 so as to be the desired viewpoint, but the method of realizing an arbitrary viewpoint is not necessarily limited to this method. The measuring system may realize the candidate viewpoint by moving the measuring device 805 with respect to the target object 804 which is statically arranged. Besides, the measuring system may realize the desired viewpoint by moving the target object 804 and the measuring device 805 together using a dual-arm robot or a plurality of robots.

As just described, according to the process of the present embodiment, the information processing apparatus 100 can acquire the observation feature group from the photographed image of the actual target object 804. Moreover, based on the acquired observation feature group, the information processing apparatus can calculate the reliability of association with each model feature, and the viewpoint evaluation value of each candidate viewpoint. Thus, the information processing apparatus 100 can more accurately select the suitable measurement viewpoint while also taking into consideration an event which is difficult to be reproduced by simulation, for example, an influence of not-modeled illumination, reflection unevenness of the surface of the target object, and the like.

(Modification 3-1)

The robot 803 of the present embodiment aims to perform, by controlling the position and orientation of the target object, the control such that the viewpoint, from which the measuring device 805 measures the target object, becomes each candidate viewpoint. To do so, the measuring system does not necessarily need to use the robot for controlling the position and orientation of the target object. That is, the measuring system may reproduce the candidate viewpoint by using a stage which translates the target object on a certain axis or rotates the target object around a certain axis. Thus, the measuring system can acquire the actual photographed image of the target object 804 by using a device which is simpler than the robot.

Embodiment 4

In each of the embodiments 1 to 3, the method of selecting the suitable viewpoint from which it is possible to measure the position and orientation with a high degree of accuracy has been described. In the embodiment 4, a measuring system which performs measurement by using the preferable viewpoint acquired by the method described in the embodiments 1 to 3 will be described. The measuring system comprises the information processing apparatus 100, and actually measures a target object based on the information concerning the viewpoint selected by the information processing apparatus 100. By doing so, it is possible for a user to save time and labor for inputting the information concerning the viewpoint selected by the information processing apparatus 100, to the measuring system.

Hereinafter, the process to be performed in the present embodiment will be described. It is assumed that the relative position and orientation between the robot 803 and the measuring device 805 included in the measuring system and the camera parameters of the measuring device 805 have been calibrated in advance. Moreover, it is assumed that how to grasp the target object 804 has been determined in advance, and the relative positions and orientations of the target object 804 and the robot at this time are also known. Therefore, it is assumed that the relative positions and orientations of the measuring device 805 and the target object 804 at the time when performing the measurement at an arbitrary viewpoint are known.

The system configuration of the measuring system in the present embodiment is the same as that in the embodiment 3, and is as shown in FIG. 8. In the present embodiment, the CPU 110 performs processes based on the programs stored in the ROM 120 or the like, so that the functions of the information processing apparatus 100 described in FIG. 2 and later FIG. 10 are realized, and the process of the flow chart described with reference to FIG. 4 is realized.

Figure 10:
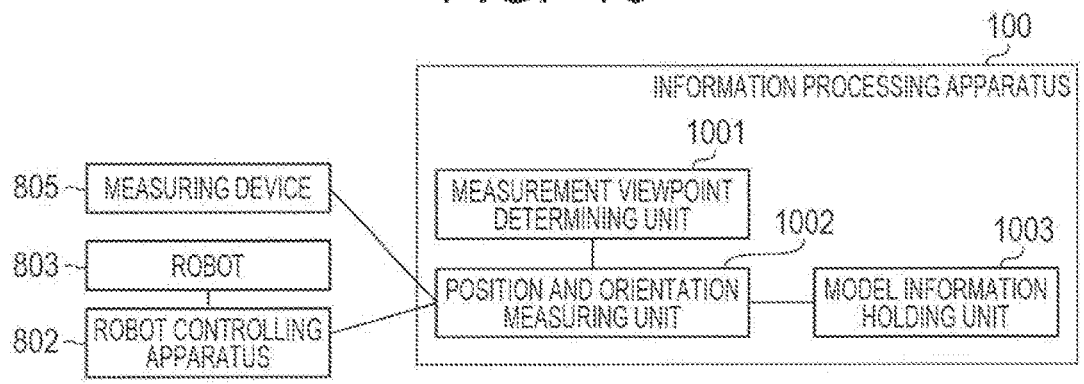

FIG. 10 is a diagram for describing an example of the functional constitution and the like for measuring the position and orientation of an object, in the information processing apparatus 100 according to the present embodiment. The information processing apparatus 100 comprises a measurement viewpoint determining unit 1001, a position and orientation measuring unit 1002, and a model information holding unit 1003. The measurement viewpoint determining unit 1001 is a functional constitution element which outputs the candidate viewpoint having the highest viewpoint evaluation value in S408, and includes the respective functional constitution elements illustrated in FIG. 2. The position and orientation measuring unit 1002 sends a command to the robot controlling apparatus 802 so as to realize the measurement viewpoint determined by the measurement viewpoint determining unit 1001. Then, the robot controlling apparatus 802 controls the position and orientation of the robot 803 according to the sent command, thereby adjusting the relative positions and orientations of the target object 804 and the measuring device 805. The model information holding unit 1003 manages the model information of the target object 804. Then, the information processing apparatus 100 measures the position and orientation of the target object 804 by checking the observation information acquired from a measuring device and the model information acquired from the model information holding unit 1003.

In the present embodiment, as well as the embodiment 1, the measurement viewpoint determining unit 1001 determines the measurement viewpoint having the highest viewpoint evaluation value, as the final measurement viewpoint. However, the measurement viewpoint determining unit may determine the final measurement viewpoint, by the method same as that in the embodiment 2 or 3.

As described above, according to the process of the present embodiment, in the measuring system, it is possible to eliminate the user's time and trouble of inputting the information of the measurement viewpoint selected by the information processing apparatus 100 to the measuring system. Thus, the measuring system can measure the position and orientation of the target object 804 using the suitable measurement viewpoint, without using the user's decision.

Other Embodiments

Embodiment(s) of the present invention can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-127780, filed Jun. 28, 2016, which is hereby incorporated by reference herein in its entirety.

What is claimed is:

1. An information processing apparatus comprising:
one or more processors;
a storage coupled with the one or more processors and including instructions stored thereon that, when executed by the one or more processors, cause the information processing apparatus to function as:
a generating unit configured to generate, based on model information including a feature of an object, a model feature indicating the feature of the object to be acquired by observing the object respectively from a plurality of candidate viewpoints;
an acquiring unit configured to acquire an image feature indicating features of images acquired by photographing the object respectively from the plurality of candidate viewpoints;
an evaluating unit configured to evaluate each of the plurality of candidate viewpoints, based on a correspondence relation between the model feature and the image feature; and
a selecting unit configured to select, from the plurality of candidate viewpoints, one or more measurement viewpoints from which the object should be measured, on the basis of evaluation by the evaluating unit for each of the plurality of candidate viewpoints.

2. The information processing apparatus according to claim 1, wherein
the instructions, when executed by the one or more processors, cause the information processing apparatus to further function as a deriving unit configured to derive reliabilities of the correspondence relation between each the model feature and the image feature, with respect to each of the plurality of candidate viewpoints, and
the evaluating unit is configured to, on the basis of the reliability for each the model feature with respect to the one candidate viewpoint, evaluate the candidate viewpoint.

3. The information processing apparatus according to claim 2, wherein
the acquiring unit is configured to acquire, as the image feature to be associated with the model feature, a feature group included in a peripheral area of the model feature, with respect to each of the plurality of candidate viewpoints, and
the deriving unit is configured to derive the reliability on the basis of a density of the feature group.

4. The information processing apparatus according to claim 2, wherein the evaluating unit is configured to acquire an evaluation value of measurement accuracy with respect to each of the plurality of candidate viewpoints, on the basis of a statistic of the reliabilities derived by the deriving unit.

5. The information processing apparatus according to claim 4, wherein the evaluating unit is configured to acquire an average value of the reliabilities as the statistic of the reliabilities.

6. The information processing apparatus according to claim 4, wherein the evaluating unit is configured to acquire, among the reliabilities derived by the deriving unit, the number of the reliabilities higher than a set threshold as the statistic.

7. The information processing apparatus according to claim 2, wherein the evaluating unit is configured to acquire an evaluation value of measurement accuracy for each of the plurality of candidate viewpoints, on the basis of the reliabilities derived by the deriving unit and a distribution of the model features.

8. The information processing apparatus according to claim 7, wherein
the deriving unit is configured to derive the reliability for each the model feature, and
the evaluating unit is configured to acquire the evaluation value of the measurement accuracy for each of the plurality of candidate viewpoints, such that the evaluation of the measurement accuracy becomes higher as deviation of the distribution of the model features of which values of the reliabilities are equal to or higher than a set threshold becomes smaller.

9. The information processing apparatus according to claim 1, wherein the acquiring unit is configured to acquire a feature group on a two-dimensional coordinate associated with the model feature, from each of the plurality of images.

10. The information processing apparatus according to claim 1, wherein the acquiring unit is configured to acquire a feature group on a three-dimensional coordinate associated with the model feature, from each of the plurality of images.

11. The information processing apparatus according to claim 1, wherein
the model feature includes the feature set on an edge of the object, and
the acquiring unit is configured to acquire, in the image feature indicating the edge acquired from grayscale images acquired by the respective photographings from the plurality of candidate viewpoints, in association with the model feature.

12. The information processing apparatus according to claim 1, wherein
the model feature includes the feature set on a surface of the object, and
the acquiring unit is configured to acquire the image feature that is a feature acquired from range images acquired by the respective photographings from the plurality of candidate viewpoints, in association with the model feature.

13. The information processing apparatus according to claim 1, wherein the acquiring unit is configured to acquire, with respect to the images acquired by the respective photographings from the plurality of candidate viewpoints, the feature group of which the respective features are set points on a two-dimensional coordinate or set points on a three-dimensional coordinate, associated with the model feature.

14. The information processing apparatus according to claim 1, wherein
the model feature includes a point on an edge of the object and a point on a surface of the object, and
the acquiring unit is configured to acquire, with respect to the images acquired by the respective photographings from the plurality of candidate viewpoints, the feature group of which the respective features are points on a two-dimensional coordinate and points on a three-dimensional coordinate, associated with the model feature.

15. The information processing apparatus according to claim 2, wherein
the acquiring unit is configured to set a plurality of vicinity viewpoints respectively around the plurality of candidate viewpoints, and further acquire the image feature of the image acquired by photographing the object related to the vicinity viewpoint, and
the evaluating unit is further configured to acquire the respective evaluation values of the measurement accuracy of the plurality of candidate viewpoints, based on the reliability related to the vicinity viewpoint derived by the deriving unit.

16. The information processing apparatus according to claim 15, wherein the evaluating unit is configured to acquire the evaluation values of the plurality of vicinity viewpoints around the plurality of candidate viewpoints, and to acquire a lowest evaluation value among the evaluation values of the plurality of vicinity viewpoints, as the evaluation value of the candidate viewpoint.

17. The information processing apparatus according to claim 1, wherein
the instructions, when executed by the one or more processors, cause the information processing apparatus to further function as a displaying unit configured to display information of the viewpoint selected as the one or more measurement viewpoints by the selecting unit, on a display.

18. An information processing method comprising:
generating, based on model information including a feature of an object, a model feature indicating the feature of the object to be acquired by observing the object respectively from a plurality of candidate viewpoints;
acquiring an image feature indicating features of images acquired by photographing the object respectively from the plurality of candidate viewpoints;
evaluating each of the plurality of candidate viewpoints, based on a correspondence relation between the model feature and the image feature; and
selecting, from the plurality of candidate viewpoints, one or more measurement viewpoints from which the object should be measured, on the basis of evaluation for each of the plurality of candidate viewpoints.

19. A non-transitory computer-readable storage medium which stores therein a program for causing a computer to perform:
generating, based on model information including a feature of an object, a model feature indicating the feature of the object to be acquired by observing the object respectively from a plurality of candidate viewpoints;
acquiring an image feature indicating features of images acquired by photographing the object respectively from the plurality of candidate viewpoints;
evaluating each of the plurality of candidate viewpoints, based on a correspondence relation between the model feature and the image feature; and
selecting, from the plurality of candidate viewpoints, one or more measurement viewpoints from which the object should be measured, on the basis of evaluation in the evaluating step for each of the plurality of candidate viewpoints.

* * * * *